(12) United States Patent
Shimatani et al.

(10) Patent No.: US 12,221,286 B2
(45) Date of Patent: Feb. 11, 2025

(54) ARTICLE TRANSPORT FEEDER, AND COMBINATION SCALE COMPRISING SAME

(71) Applicant: YAMATO SCALE CO., LTD., Akashi (JP)

(72) Inventors: Shogo Shimatani, Akashi (JP); Ryo Suemichi, Akashi (JP)

(73) Assignee: YAMATO SCALE CO., LTD., Hyogo (JP)

( * ) Notice: Subject to any disclaimer, the term of this patent is extended or adjusted under 35 U.S.C. 154(b) by 121 days.

(21) Appl. No.: 18/023,282

(22) PCT Filed: Aug. 26, 2020

(86) PCT No.: PCT/JP2020/032154
§ 371 (c)(1),
(2) Date: Feb. 24, 2023

(87) PCT Pub. No.: WO2022/044155
PCT Pub. Date: Mar. 3, 2022

(65) Prior Publication Data
US 2023/0322494 A1    Oct. 12, 2023

(51) Int. Cl.
*B65G 27/16*    (2006.01)
(52) U.S. Cl.
CPC .................................... *B65G 27/16* (2013.01)
(58) Field of Classification Search
None
See application file for complete search history.

(56) References Cited

U.S. PATENT DOCUMENTS

| | | | | |
|---|---|---|---|---|
| 5,379,923 A | * | 1/1995 | Sagastegui | G01G 13/18 222/181.2 |
| 5,726,394 A | | 3/1998 | Kramer sen et al. | |
| 5,773,765 A | * | 6/1998 | Sashiki | B65G 27/08 177/25.18 |
| 6,365,845 B1 | * | 4/2002 | Pearce | G01G 21/28 177/180 |
| 7,053,317 B2 | * | 5/2006 | Asai | G01G 13/16 177/25.18 |

(Continued)

FOREIGN PATENT DOCUMENTS

| | | | | |
|---|---|---|---|---|
| EP | 3196153 A1 | * | 7/2017 | B65G 27/08 |
| JP | H04-118632 | | 10/1992 | |

(Continued)

*Primary Examiner* — Kavel Singh
(74) *Attorney, Agent, or Firm* — Norris McLaughlin, P.A.

(57) ABSTRACT

An article transport feeder is equipped with an article transporter removably attachable to a vibratory head of a vibration mechanism. The article transport feeder is also equipped with a fastening unit having an operation lever. The fastening unit rotates the operation lever to retainably engage the article transporter with the vibratory head by fastening. The article transport feeder is further equipped with a movable coupling member having a spindle elastically deformable. The movable coupling member is coupleable to the fastening unit and allowed to move along with the rotation of the operation lever. The spindle is elastically deformable by moving the movable coupling member along with the rotation of the operation lever of the fastening unit to elastically retain the engagement of the article transporter with the vibratory head.

5 Claims, 7 Drawing Sheets

(56) References Cited

U.S. PATENT DOCUMENTS

| | | | | |
|---|---|---|---|---|
| 9,234,787 | B2 * | 1/2016 | Nagai | G01G 19/387 |
| 9,296,545 | B2 * | 3/2016 | Daniels | B65G 47/1492 |
| 9,459,133 | B2 * | 10/2016 | Nagai | G01G 19/393 |
| 10,000,343 | B2 | 6/2018 | Kageyama et al. | |
| 10,322,886 | B2 * | 6/2019 | Kageyama | G01G 23/00 |
| 10,323,977 | B2 * | 6/2019 | Horitani | G01G 19/393 |
| 10,557,747 | B2 * | 2/2020 | Kishikawa | G01G 19/393 |
| 10,876,885 | B2 * | 12/2020 | Takeichi | G01G 19/52 |
| 11,261,033 | B2 * | 3/2022 | Nagai | G01G 19/393 |
| 11,333,546 | B2 * | 5/2022 | Takeichi | G01G 19/393 |
| 12,018,977 | B2 * | 6/2024 | Yamada | G01G 21/28 |

FOREIGN PATENT DOCUMENTS

| | | |
|---|---|---|
| JP | 2001-253526 A | 9/2001 |
| JP | 2016-145782 A | 8/2016 |
| JP | 2017-26339 A | 2/2017 |
| JP | 2020-64016 A | 4/2020 |
| WO | 2016/043332 A1 | 3/2016 |

* cited by examiner

ARTICLE TRANSPORT FEEDER, AND COMBINATION SCALE COMPRISING SAME

TECHNICAL FIELD

This invention relates to an article transport feeder for use in transport of articles and a combination scale equipped with the feeder.

BACKGROUND ART

Conventionally, the combination scale may be typically equipped with a dispersion feeder with a top cone disposed in an upper part of its body, a plurality of linear feeders radially disposed around the dispersion feeder, and a plurality of feeding feeders disposed correspondingly to the linear feeders. First, articles to be weighed are supplied into the top cone and then vibrationally transported outward by the dispersion feeder. The articles are then vibrationally transported further outward by the linear feeders and thrown into the feeding hoppers.

A plurality of weighing hoppers are disposed below and correspondingly to the feeding hoppers. The feeding hoppers each discharge the articles into a respective one of the weighing hoppers to be weighed. Then, combinatorial computations are executed based on weights of the articles measured in the weighing hoppers to select a combination of hoppers containing the articles of a weight that stays within a predetermined range of weights. Then, the articles are discharged out of the selected hoppers, dropping downward along a collection chute into a packaging machine disposed down below.

In any combinations scales used to weigh foodstuffs, regular cleaning is indispensable in view of hygiene, as well as optional cleaning every time when the type of food to be weighed is changed. The top cone of the dispersion feeder, troughs of the linear feeders, feeding hoppers and weighing hoppers need to be cleaned at regular intervals and are thus attached to the combination scale in an easily detachable manner.

The linear feeders each have a trough; an article transporter. The trough is used to put in and transport the articles and is attached to and removed from the vibratory head of an electromagnetic vibration mechanism. Patent literature 1 describes an example of how to removably attach the trough to the vibratory head, which uses a coupling member disposed on the lower surface of each linear feeder's trough and a fastening unit with an operation lever. The operation lever of the fastening unit is rotated with the coupling member being positionally fixed and engaged with the vibratory head, so that the trough is engageably pushed against and firmly coupled to the vibratory head.

CITATION LIST

Patent Literature

Patent Literature: JP 2020-64016 A

SUMMARY OF THE INVENTION

Technical Problems

Such a fastening structure, if enabled by rotating the operation lever, may need to be equipped with, in part thereof, an elastically deformable member that exerts an elastic fastening force. The elastically deformable member used in patent literature 1 is a coil spring.

The coil spring, however, may easily catch broken pieces and/or scraps of the articles, and it is quite a labor to remove such broken pieces that adhere to or penetrated into the coil spring. In the case of food-handling combination scales, in particular, cleaning should be more careful and thorough in view of hygiene, requiring an enormous amount of time and labor for cleaning of a large number of feeders.

This invention was accomplished to address these issues of the known art and is directed to providing an article transport feeder easily cleanable that allows an article transporter to be stably and accurately coupled by fastening to a vibratory head, and a combination scale equipped with the feeder.

Technical Solution

To this end, this invention provides the following technical features.

1] An article transport feeder according to this invention is equipped with an article transporter used to put in and transport an article. The article transporter is removably attachable to a vibratory head of a vibration mechanism. The article transport feeder is further equipped with a fastening unit having an operation lever. The fastening unit rotates the operation lever to retainably engage the article transporter with the vibratory head by fastening. The article transport feeder is also equipped with a movable coupling member having a spindle elastically deformable. The movable coupling member is coupleable to the fastening unit and is allowed to move along with the rotation of the operation lever. The spindle is elastically deformable by moving the movable coupling member along with the rotation of the operation lever to elastically retain the engagement of the article transporter with the vibratory head.

The article transport feeder according to this invention is equipped with an elastically deformable spindle to elastically keep the article transporter and the vibratory head engaged with each other. This spindle is rather simple in shape and is easily cleanable.

The elasticity of the spindle may be decided by its material, diameter, and support span, which are all easily and accurately manageable factors. Thus, the elasticity of this spindle may be easily kept at a constant level, which may reliably ensure a desirable fastening property.

In a preferred embodiment of this invention, the article transporter includes the fastening unit and the movable coupling member, the vibratory head and the movable coupling member each have a wedge inclined surface for engagement purpose, and the article transporter is pushed toward the vibratory head by a wedge action exerted by the wedge inclined surfaces along with the movement of the movable coupling member.

According to this embodiment, the vibratory head and the movable coupling member may be reliably engaged with each other through elastic fastening using the wedge inclined surfaces. Thus, the movable coupling member, if repeatedly attached to and detached from the vibratory head, may be pushed against and coupled to the vibratory head without losing an expected fastening force.

3) In another preferred embodiment of this invention, the spindle of the movable coupling member and the operation lever of the fastening unit are coupled to each other with a fastening rod.

According to this embodiment, an external force is applied to the spindle of the movable coupling member through the fastening rod along with the rotation of the operation lever. As a result, the spindle is elastically deformed to stabilize the fastening.

4) In yet another preferred embodiment of this invention, a coupling member is externally mounted to an intermediate portion of the spindle of the movable coupling member, and a bush is fitted to a portion of the movable coupling member at which the spindle is inserted.

In case, for example, the coupling member made of a metallic material is externally mounted to the spindle of the movable coupling member made of a hard resin material, the edge of a hole formed in the coupling member for spindle insertion may possibly bite directly into the spindle, causing damage to the spindle. According to this embodiment, however, the bush fitted to the spindle inserting portion may avoid such damage to the spindle, promising an expected elastic property. Thus, the spindle often deformed and warped may durable for long-term use.

5) In yet another preferred embodiment of this invention, the fastening rod is threadedly connected to the coupling member externally fitted to the intermediate portion of the spindle and the spindle of the operation lever in a reverse threaded relationship.

According to this embodiment, the distance between the coupling member and the spindle of the operation lever may be suitably adjustable by rotating the fastening rod. Such factors as aging degradation and unrestorable warp the spindle of the movable coupling member may weaken its elastic property, resulting in a poor fastening force. Yet, a desired fastening property may be regained by adjustably rotating the fastening rod.

6) A combination scale according to this invention is equipped with a dispersion feeder, a plurality of linear feeders radially disposed around the dispersion feeder, and a plurality of feeding feeders disposed correspondingly to the linear feeders. The linear feeders are each the article transport feeder as defined in 1) to 5). The article transport feeders each have a trough, and the troughs each serve as the article transporter removably attachable to the vibratory head of the vibration mechanism.

The combination scale according to this invention uses the elastically deformable spindle to elastically keep the engagement between the trough and the vibratory head of the liner feeder. The spindle simpler in shape than the coil spring may be more easily cleanable, conducing to reduction of time and labor required for cleaning of the multiple linear feeders.

The trough of the linear feeder removed and cleaned may be accurately coupled again to the vibratory head of the vibration mechanism with a predetermined fastening force.

Effects of the Invention

This invention may thus facilitate cleaning work and may allow the article transporter to be stably and accurately coupled by fastening to the vibratory head.

DESCRIPTION OF EMBODIMENTS

An embodiment of this invention is hereinafter described in detail with reference to the accompanying drawings.

Figure 1:
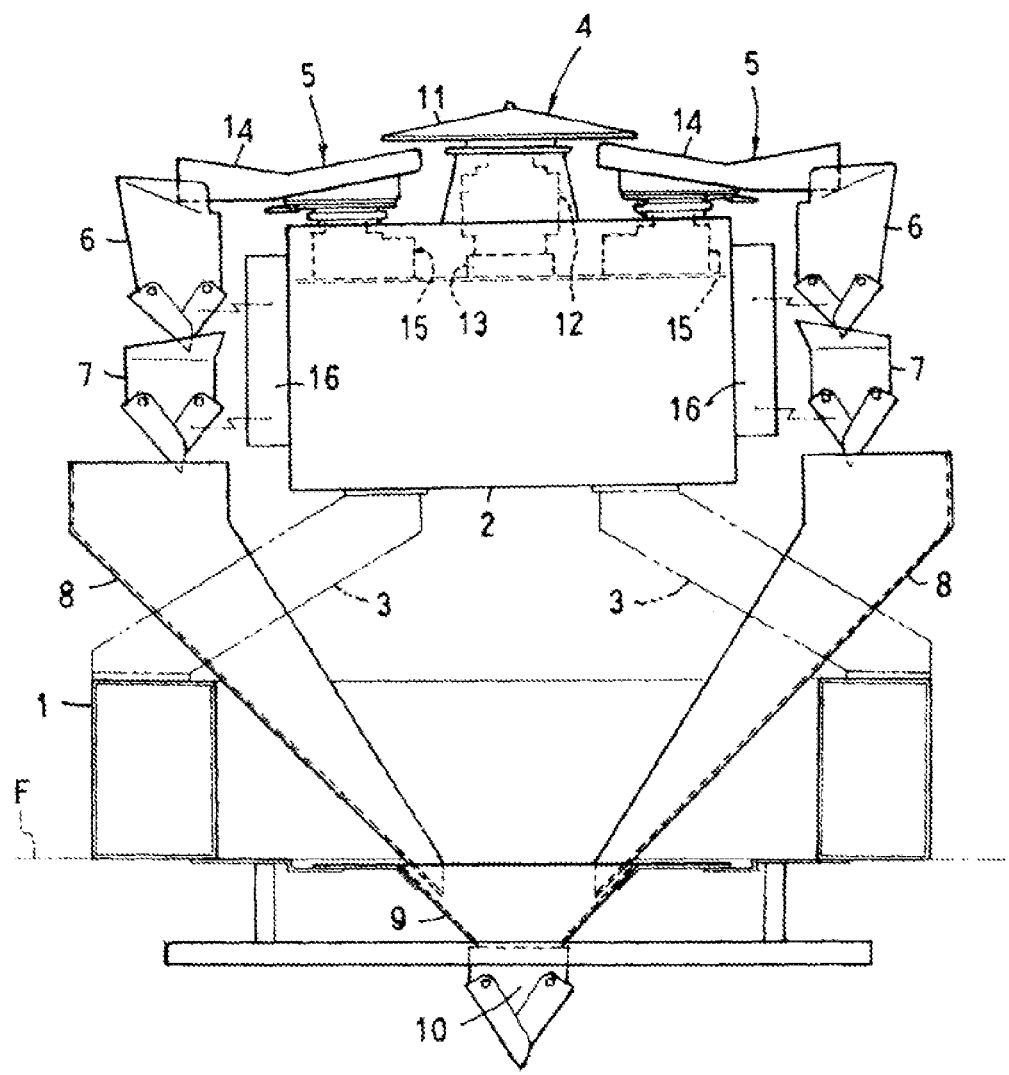
FIG. 1 is a schematic drawing of a combination scale according to an embodiment of this invention.

FIG. 1 is a schematic drawing of a combination scale equipped with an article transport feeder according to an embodiment of this invention. The combination scale according to this embodiment weights and discharges a predetermined quantity of articles, for example, different kinds of foodstuffs. This combination scale may be installed on a floor surface F and is used in a packaging line in which the weighed articles are thrown into a packaging machine disposed below (not illustrated in the drawings) and then packed into bags.

A hollow pedestal 1 rectangular in planar view is disposed on the floor surface F. This hollow pedestal 1 has a large, vertically through opening at its center. At the center of the scale and in the upper direction of the pedestal 1, a center base 2 is supported by the pedestal 1 through a plurality of leg portions 3.

A dispersion feeder 4 is disposed at the center and in the upper direction of the center base 2. The dispersion feeder 4 receives articles dropping from a feeding conveyer not illustrated in the drawings, and then transports the received articles by radially dispersing them through vibrations. A large number of linear feeders 5; article transport feeders, are disposed radially around the dispersion feeder 4. These linear feeders 5 receive the articles from the dispersion feeder 4 and linearly transports the articles outward through vibrations.

This combination scale further has, in the outer circumference of the center base 2, feeding hoppers 6 and weighing hoppers 7. The feeding hoppers 6 temporarily retain the articles transported by the linear feeders 5. The weighing hoppers 7 weigh the articles discharged from the feeding hoppers 6. The articles are variously combined, weighed and then discharged by a large number of weighing units each having the linear feeder 5, feeding hopper 6 and weighing hopper 7.

A collection chute 8 is disposed at a position below the weighing hoppers 7. The collection chute 8 receives the articles discharged from the weighing hoppers 7 containing the articles having a summed weight that falls within a predetermined range of weights. At a position below the collection chute 8 is disposed a collection funnel 9 that collects the articles dropping from the collection chute 8. A collection hopper 10 is disposed below the collection funnel 9. The articles collected by the collection funnel 9 are received and temporarily retained by the collection hopper 10 and then discharged from the collection hopper 10 based on an article discharge request from the packaging machine.

The dispersion feeder 4 includes a top cone 11 having a gently inclined umbrella-like shape. The dispersion feeder 4 further has a vibration mechanism 12 driven to vibrate the top cone 11. The vibration mechanism 12 has a vibratory head and is installed on the inner side and at the center of the center base 2. Though not illustrated in the drawings in detail, the vibratory head of the vibration mechanism 12 is exposed out of the upper surface of the center base 2. The top cone 11 is removably attached to the vibratory head. The vibration mechanism 12 is supported by a weight sensor 13 in the center base 1. This weight sensor 13 detects the weight of the articles on the dispersion feeder 4. The feeding conveyer, not illustrated in the drawings, is turned on and off based on information of the detected weight to feed the articles of a weight that stays within a preset range onto the dispersion feeder.

The linear feeders 5 each have a trough 14 and an electromagnetic vibration mechanism 15 driven to vibration this trough. The vibration mechanisms 15 of the linear feeders 5 are disposed in the center base 2 in a manner that surround the vibration mechanism 12 of the dispersion feeder 5.

A driving unit 16 including driving mechanisms and weight sensors is mounted to the outer circumference of the center base 2. The driving mechanism is driven to open and close gates of the feeding hopper 6 and of the weighing hopper 7. The weight sensor is used to detect the weight of the articles in the weighing hopper 7. The feeding hopper 6 and the weighing hopper 7 are removably attached to this driving unit 16.

In the combination scale according to this embodiment, the trough 14 is attached and detached to and from the linear feeder 5; an example of the article transport feeder, as described below. In the description below, "front side" (ahead) refers to a transport-starting side of the linear feeder 5, "rear side" (behind) refers to a transport-ending side of the linear feeder 5 (closer to the feeding hopper 6), and "lateral direction" refers to a horizontal direction orthogonal to the direction of transport of the linear feeder 5.

Figure 2:
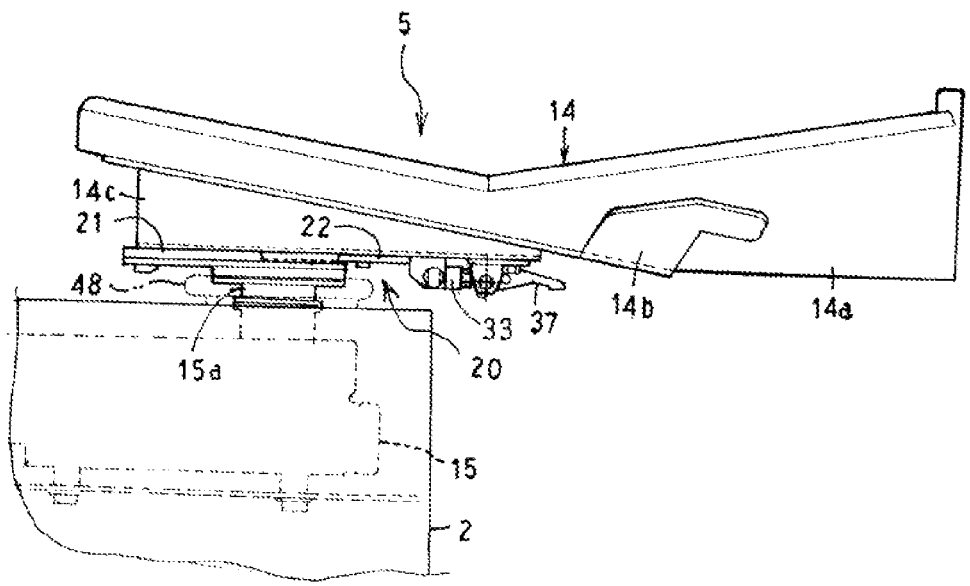
FIG. 2 is a lateral view of a linear feeder in the combination scale illustrated in FIG. 1.
Figure 3:
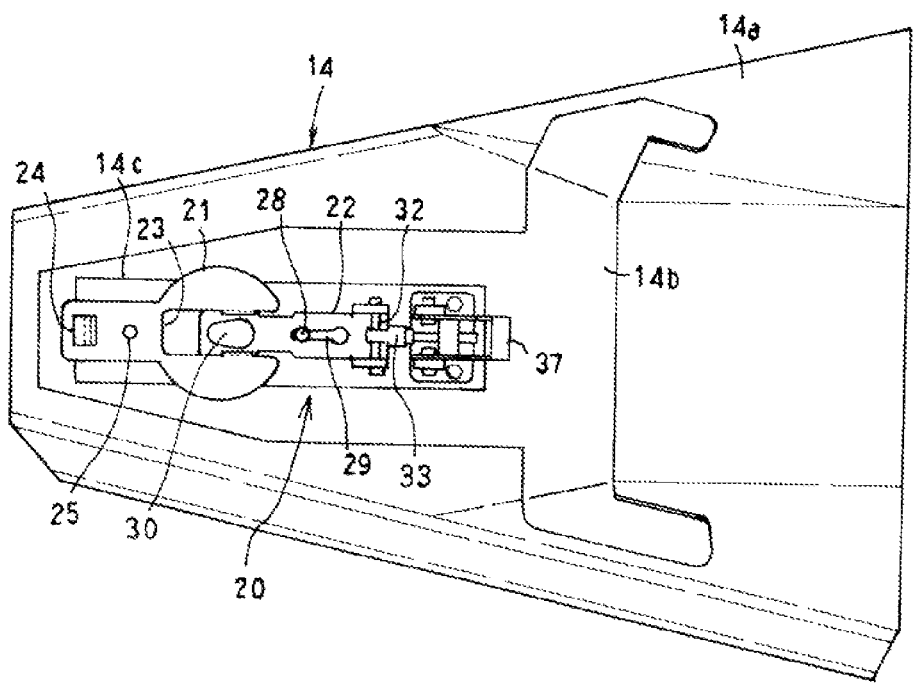
FIG. 3 is a bottom view of the linear feeder.
Figure 4:
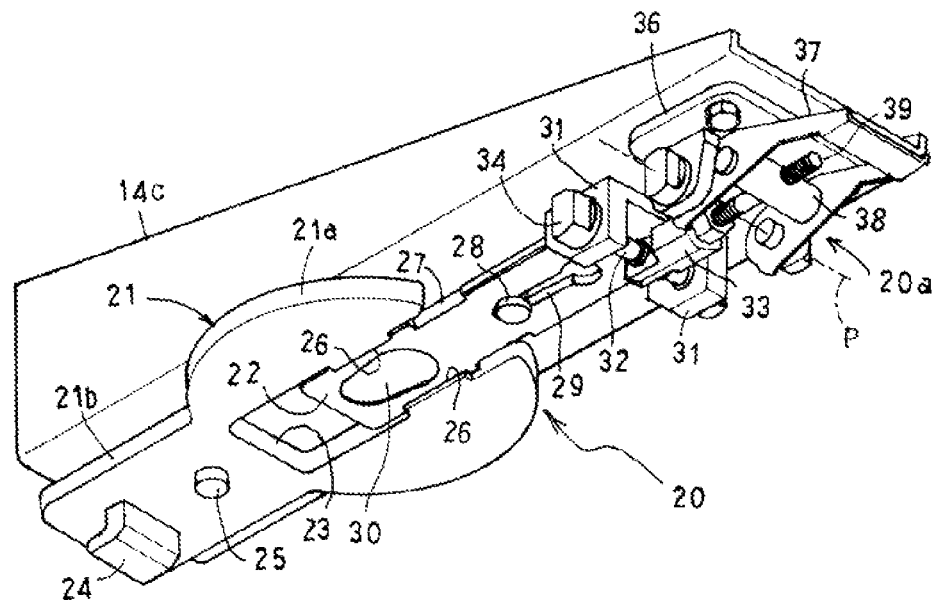
FIG. 4 is a perspective view from below of a trough mounting portion of the linear feeder.
Figure 5:
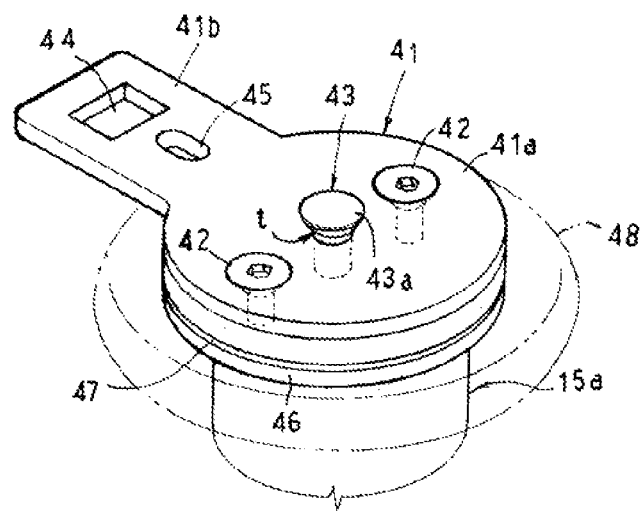
FIG. 5 is a perspective view of the vibratory head of the linear feeder.
Figure 6:
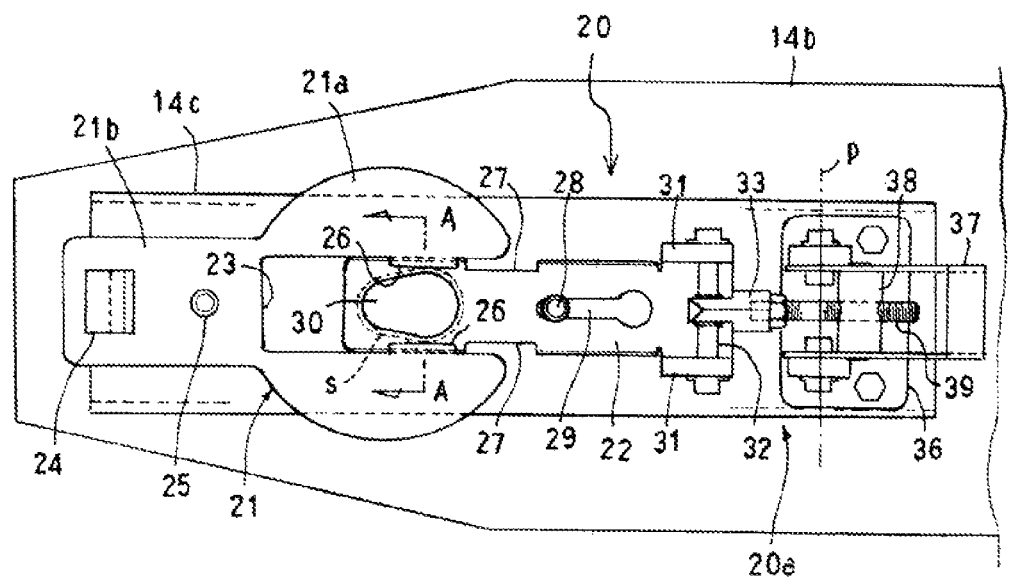
FIG. 6 is a bottom view of the trough mounting portion of the linear feeder.

FIG. 2 is a lateral view of the linear feeder 5 in the combination scale illustrated in FIG. 1. FIG. 3 is a bottom view of the linear feeder 5. FIG. 4 is a perspective view from below of the trough mounting portion of the linear feeder 5. FIG. 5 is a perspective view of the vibratory head of the linear feeder 5. FIG. 6 is a bottom view of the trough mounting portion of the linear feeder 5.

The trough 14; an example of the article transporter, of the linear feeder 5 includes a trough body 14a, a reinforcing plate 14b and a support plate 14c. The trough body 14a is obtained by bending a thin plate member into the form of a trough-like container with an opening larger more upward on its upper side. The support plate 14c is large in length in its longitudinal direction and is obtained by bending a thick plate member into a U-like shape. The reinforcing plate 14b is securely welded to the outer and lower surfaces of the trough body 14a, and the plate 14c is securely welded to the lower surface of the reinforcing plate 14b. The support plate 14c has, on its lower surface, an attach-detach mechanism 20 used for the vibratory head 15a of the vibration mechanism 15.

The attach-detach mechanism 20 is equipped with a coupling plate 21 and a movable coupling plate 22. The coupling plate 21 is made of a thick plate member and is securely welded to the support plate 14c on the lower surface of the trough. The movable coupling member 22; an example of the movable coupling member, is a longitudinally long plate and is supportably fitted to the coupling plate 21 so as to slide forward and backward.

As illustrated in FIG. 4, the coupling plate 21 has, in its rear part, a substantially circular setting portion 21a. The coupling plate 21 further has, in its front part, an engageable coupling portion 21b having a rectangular shape. The setting portion 21a has a guiding recess 23 with an opening directed backward. The guiding recess 23 is formed to receive the movable coupling plate 22 which is inserted and fitted into this recess so as to slide forward and backward. The engageable coupling portion 21b has, on its lower surface, an engagement hook 24 directed forward, and an engagement pin 25 used for lateral positioning. The engagement hook 24 and the engagement pin 25 are protruding from the lower surface.

Figure 8:
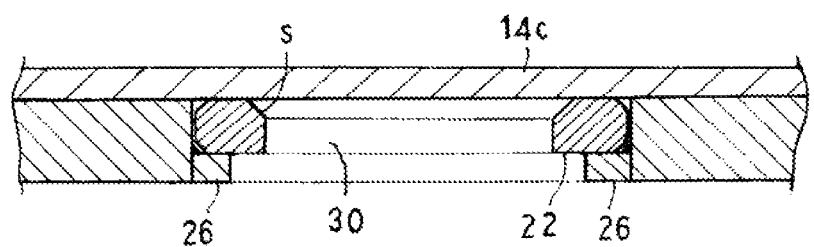
FIG. 8 is an A-A cross-sectional view of FIG. 6.

The movable coupling plate 22 is slightly thinner than the coupling plate 21. The coupling plate 21 has engagement pieces 26 on its inner surfaces facing each other across the guiding recess 23. The engagement pieces 26 are large in length in its longitudinal direction. The engagement pieces 26 are securely welded to the lower surface of the coupling plate 21, so that these pieces are flush with this lower surface and protrude toward the inner side of the guiding recess 23. These engagement pieces 26 have a vertical thickness corresponding to the difference between thicknesses of the coupling plate 21 and of the movable coupling plate 22. As illustrated in FIG. 8 showing a cross-sectional view along A-A line in FIG. 6, lateral end sides of the movable coupling plate 22 are inserted and fitted in the guiding recess 23 and are held between the lower surface of the support plate 14c and the upper surfaces of the engagement pieces 26. In this manner, the engagement pieces 26 are supported and guided so as to slide forward and backward.

Figure 7:
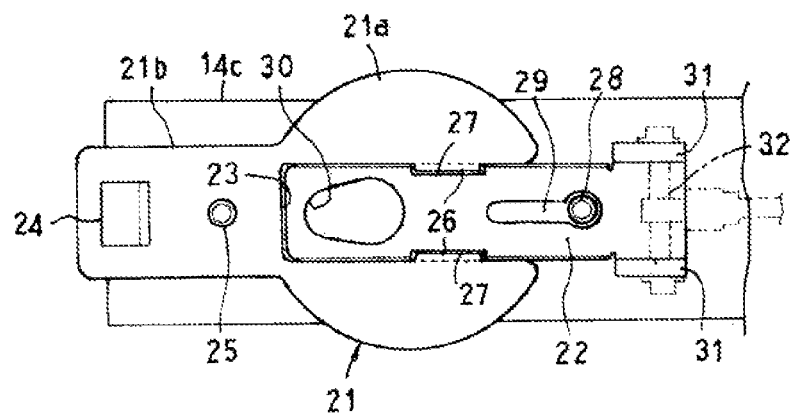
FIG. 7 is a bottom view of the trough mounting portion of the linear feeder, illustrating a mounting process.

On the lateral end sides of the movable coupling plate 22 are formed fitting recesses 27 slightly larger than the longitudinal length of the engagement piece 26. To allow the movable coupling plate 22 to fit to the coupling plate 21, the fitting recesses 27 are positionally aligned to the engagement pieces 26, the movable coupling plate 22 is then fitted into the guiding recess 23, and the movable coupling plate 22 is moved backward, as illustrated in FIG. 7. Thus, the movable coupling plate may be successfully fitted to and supported by the coupling plate 21 without the risk of being accidentally dropped.

The support plate 14c has, on its lower surface, a guiding pin 28 with a diametrically larger portion. The guiding pin 28 is formed so as to protrude from this lower surface. The movable coupling plate 22 has a guiding groove 29 into which the guiding pin 28 is engageably inserted. The movable coupling plate 22 is engaged and supported at two front and rear positions by the engagement pieces 26 and the guiding pin 28 and is fitted and supported so as to be slidable in the front and rear directions without dropping.

The movable coupling plate 22 has, at its front end part, an engagement hole 30. This hole is reduced in width toward its front end and is used for engagement of the movable coupling plate 22 with the vibratory head 15a. As illustrated in FIGS. 6 and 8, a wedge inclined surface "s" is formed in an peripheral edge of the engagement hole 30. The wedge inclined surface "s" is directed inward and downward.

As illustrated in FIGS. 4 and 6, the movable coupling plate 22 is coupled to a fastening unit 20a disposed on the rear side of the attach-detach mechanism 20. The fastening unit 20a has an operation lever 37, and the movable coupling plate 22 is allowed to slide forward and backward by rotating the operation lever 37.

Shaft struts 31 are laterally disposed in a pair on the rear end side of the movable coupling plate 22. A spindle 32 is horizontally supported from one of the shaft struts to the other. A coupling member 33 is externally mounted in a rotatable manner to a laterally intermediate position of the spindle 32.

Figure 9:
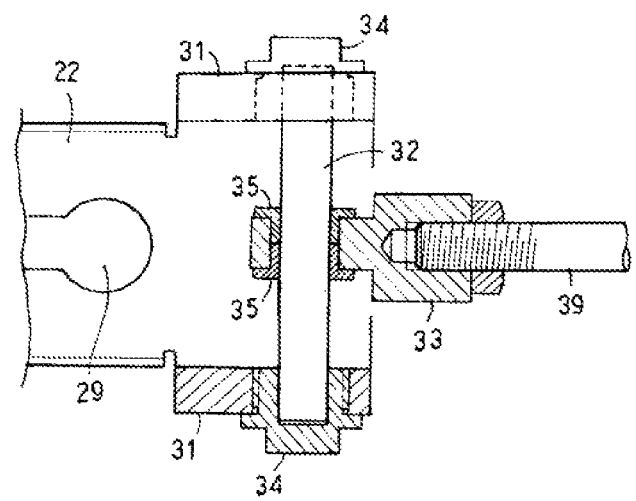
FIG. 9 is a transverse bottom view that illustrating part of the trough mounting portion of the linear feeder.

The spindle 32 is made of a hard resin material elastically deformable, for example, carbon fiber reinforced plastics (CFRP). As illustrated in the transverse bottom view of FIG. 9, bearing members 34 are externally threaded into the shaft struts 31 securely to certain positions. The spindle 32, with its ends being inserted into the bearing members 34, is supported on the laterally both sides. The spindle 32 may be easily removed along the shaft center when the bearing members 34 are pulled off outward from the shaft struts 31. This may facilitate replacement of the spindle 32, if damaged or broken.

Laterally paired bushes 35 made of a resin material are fitted to a portion of the coupling member 33 at which the spindle 32 is inserted through. When the spindle 32 is inserted through a hole formed in the coupling member 33 made of a metallic material, for example, stainless steel, the edge of this hole may possibly bite directly into and damage or break the spindle 32. The bushes 35 are intended to avoid such damage or breakage of the spindle 32. The bushes 35 may instead be integral with the coupling member.

As illustrated in FIGS. 4 and 6, the fastening unit 20*a* is equipped with a fulcrum bracket 36 and an operation lever 37. The fulcrum bracket 36 is coupled with bolts to the lower surface of the support plate 14*c*. The operation lever 37 is pivotally coupled to the fulcrum bracket 36 so as to vertically rotate around a laterally extending fulcrum "p". The operation lever 37 has, at a longitudinally intermediate portion thereof, a spindle 38 disposed in a rotatable manner. A fastening rod 39 is coupleably threaded orthogonally into a center part of the support shaft 38 so as to extend forward. A front end part of the fastening rod 39 is coupleably threaded into the coupling member 33 mounted to the movable coupling plate 22 through the spindle 32.

The fastening rod 39 has, at its both ends, threads formed in reverse directions. The thread formed at one end is a left-hand thread, while the thread formed in the other is a right-hand thread. The distance between the coupling member 33 and the spindle 38 may be finely adjusted by rotating the fastening 39 forward and backward.

A mounting plate 41 made of a thick plate material is horizontally coupled, with a pair of screws 42, securely to the vibratory head 15*a* of the vibration mechanism 15. The mounting plate 41 has a circular mounting portion 41*a* and a rectangular, engageable coupling portion 41*b* extending forward from this mounting portion. A coupling pin 43 with a diametrically large head 43*a* is securely welded to the mounting portion 41*a* of the mounting plate 41. The coupling pin 43 is standing upright from the center of the mounting portion 41*a*. The diametrically large head 43*a* of the coupling pin 43 has a reversed umbrella-like shape with a wedge inclined surface "t" directed outward and downward.

The engageable coupling portion 41*b* has a rectangular engaging hole 44 and a long hole 45. The engaging hole 44 is so shaped that can correspond to the trough-side engagement hook 24. The long hole 45 is so shaped that can correspond to the trough-side engagement pin 25.

The mounting plate 41 is fastened, with the circular support plate 45 disposed therebelow, to the vibratory head 15*a* and thereby securely coupled to this head. The support plate 46 has an annular groove 47, and the upper opening edge of a waterproof bellows 48 is supportably fitted into this annular groove. The lower opening edge of the waterproof bellows 48 is water-tightly fitted into and supported by the peripheral edge of an opening for head insertion formed in the upper surface of the center base 2. The waterproof bellows 48 may successfully prevent the inflow of cleaning water into the center base 2 during cleaning of the removed trough 14.

The trough 14 is securely coupled to the vibration mechanism 15 using the attach-detach mechanism 20, steps of which are hereinafter described in detail.

Figure 10:
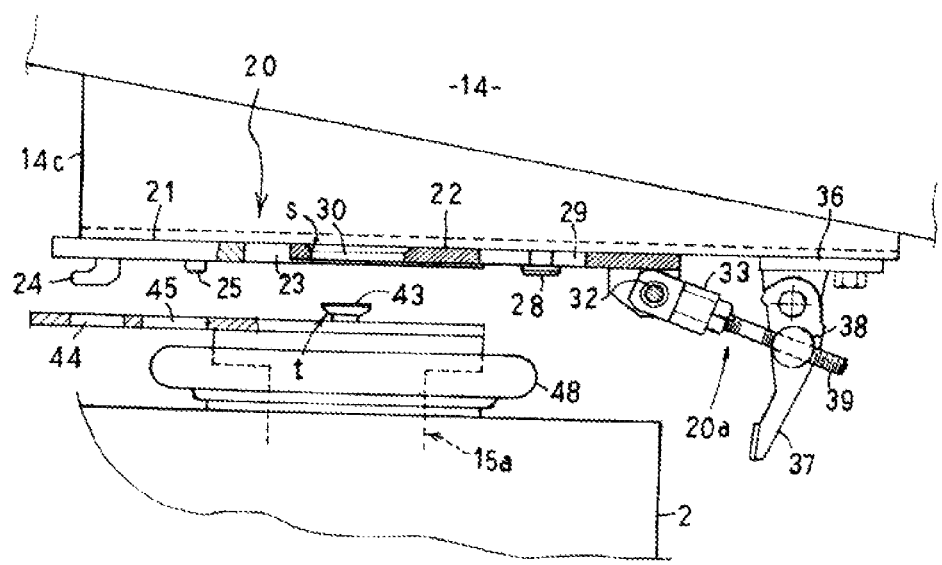
FIG. 10 is a partly broken lateral view, illustrating a trough mounting process in the linear feeder.

First, the operation lever 37 of the fastening unit 20*a* is rotated downward through a large angle, as illustrated in FIG. 10, so that the movable coupling plate 22 slides and moves forward. Then, the trough 14 is moved to an upper position of the vibratory head 15*a*.

Figure 11:
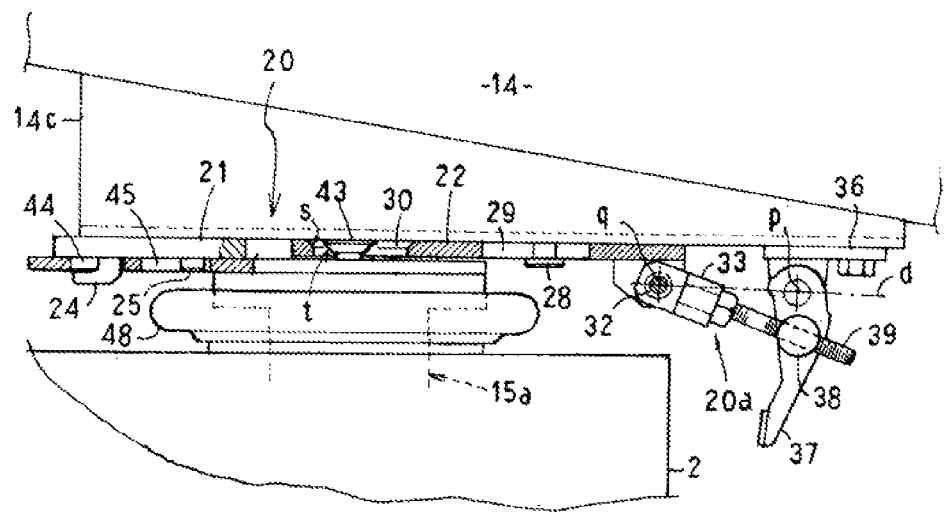
FIG. 11 is a partly broken lateral view, illustrating a trough mounting process in the linear feeder.

As illustrated in FIG. 11, the trough 14 is mounted to the vibratory head 15*a*, the engagement hook 24 is inserted into the engagement hole 44, and the engagement pin 25 is engaged with the front part of the long hole 45. At the time, the coupling pin 43 is inserted into a diametrically large portion of the engagement hole 30 formed in the movable coupling plate 22.

Figure 12:
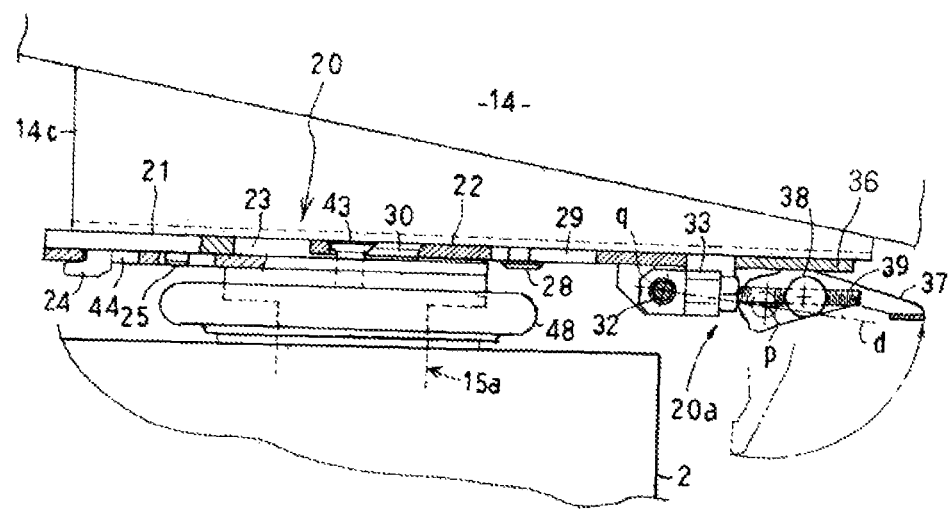
FIG. 12 is a partly broken lateral view, illustrating a trough mounting process in the linear feeder.

Next, the trough 14 mounted to the vibratory head 15*a* is slightly moved forward to push an inner portion of the engagement hook 24 against the front edge of the engagement hole 44. Then, the operation lever 37 is rotated upward, as illustrated in FIG. 12. This upward rotation of the operation lever 37 moves the spindle 38 backward, inviting the movable coupling plate 22 to slide and move backward.

Figure 13:
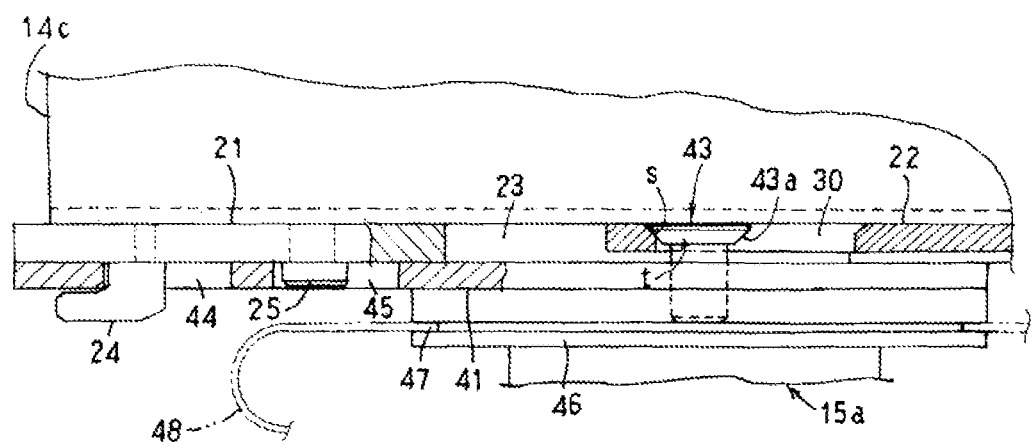
FIG. 13 is a partly broken lateral view, illustrating a trough mounting process in the linear feeder.

By the time when the shaft center of the spindle 38 moves upward beyond a dead point "d" passing through the level fulcrum "p" and shaft center "q", the coupling plate 22 moves backward. Then, a diametrically small portion of the engagement hole 30 is caught by the diametrically large head of the coupling pin 43. As a result, the upward wedge inclined surface "s" of the engagement hole 30 is engaged with the downward wedge inclined surface "t" of the diametrically large head 43, as illustrated in FIG. 13.

When the operation lever 37 is rotated hard further upward, the spindle 38 is deterred from moving backward by the engagement of the coupling pin 43 with the engagement hole 30. Then, the spindle 38 is further displaced backward, and the fastening rod 39 is pulled hard backward. This force generated backward acts on the center portion of the spindle 32 through the coupling member 33, causing the spindle 32 to elastically deform backward.

Once the shaft center "q" of the spindle 38 arrives at the dead point "d" passing through the lever fulcrum "p" and the shaft center "q" of the spindle 38, the spindle 32 is deformed to the maximum.

When the upper end side of the operation lever 37 reaches an upper limit of rotation at which contact is made with the bottom surface of the fulcrum bracket 36, the shaft center of the spindle 38 is at a position slightly past the dead point "p" in the upper direction. At the time, the spindle 32 is slightly warping. The elastic restoration force exerted then pulls the movable coupling plate 22 forward and pushes the coupling plate 21 forward. Thus, the engaging hook 24 may be firmly engaged with the engagement hole 44. Further, a wedging action is exerted by the engaged wedge inclined surfaces "s" and "t" of the engagement hole 30 and of the coupling pint 43. This wedging action pushes the movable coupling plate 22 against the vibratory head 15*a*, as a result of which the coupling plate 21 is pushed against and engaged with the mounting plate 41 of the vibratory head 15*a*.

Thus, the whole trough 14 may be accurately located at a given position relative to the vibratory head 15a and firmly secured by fastening.

By reversing the steps described so far, the trough 14 may be readily removed from the vibratory head 15a. Then, the trough 14 and the vibratory head 15a exposed out of the center base 2 may be both easily cleaned.

Cleaning water is flashed against the trough 14 that has been removed while, at the same time, sliding and moving the movable coupling plate 22 forward and backward by rotating the operation lever 37 forward and backward. Thus, any unwanted material adhered to the trough 14 may be easily cleaned off.

As illustrated in FIG. 5, the trough-removed vibratory head 15a is substantially flat except the engagement hole 44 and the long hole 45 formed in the mounting plate 41 and the coupling pin 43 sticking out from this mounting plate. Any broken pieces or scraps of the articles, if adhered to the mounting plate 14, may be easily cleaned off.

According to this embodiment, any error generated in the production or assembling of parts may be absorbed by the elastic deformation of the spindle 32. Conventionally, the linear feeders 5 of the combination scale may have to be adjusted, one by one, to gain an equal fastening strength and accuracy. This embodiment, however, may dispense with such a time-consuming labor.

The elasticity of the spindle 32 may change with time due to, for example, abrasion, resulting in a poor fastening strength. The degree of fastening strength, however, may be adjusted and regained by rotating the fastening rod 39. The spindle 32 may significantly degrade in elasticity or break in part or in whole. Yet, the spindle 32 may be easily removed and replaced with a new one by simply pulling the bearing members 34 outward from the shaft struts 31.

Another Embodiment

This invention include the following embodiments.
1) In the weighing apparatus according to the earlier embodiment, a plurality of weighing units each having the linear feeder 5, feeding hopper 6 and weighing hopper 7 are circularly arranged around the dispersion feeder 4. This invention is applicable to a differently structured weighing apparatus(es) in which, multiple weighing units are arranged otherwise, for example, laterally arranged in a row.
2) This invention is also applicable to a dispersion feeder for article transport in which the top cone is used as an article transporter.

REFERENCE SIGNS LIST 5 linear feeder
14 trough (article transporter)
15 vibration mechanism
15a vibratory head
20 attach-detach mechanism
20a fastening unit
22 movable coupling plate (movable coupling member)
31 shaft strut
32 spindle
34 bearing member
37 operation lever
38 spindle
39 fastening rod

The invention claimed is:

1. An article transport feeder, comprising:
an article transporter used to put in and transport an article, the article transporter being removably attachable to a vibratory head of a vibration mechanism;
a fastening unit comprising an operation lever, the fastening unit rotating the operation lever to retainably engage the article transporter with the vibratory head by fastening; and
a movable coupling member having an elastically deformable spindle situated thereon, the elastically deformable spindle comprising a cylindrical member rotatably mounted on an underside of the movable coupling member, the movable coupling member being coupleable to the fastening unit and allowed to move along with the rotation of the operation lever,
the elastically deformable spindle being elastically deformable by moving the movable coupling member along with the rotation of the operation lever of the fastening unit to elastically retain the engagement of the article transporter with the vibratory head,
wherein
the article transporter comprises the fastening unit and the movable coupling member,
the vibratory head and the movable coupling member each have a wedge inclined surface for engagement purpose, and
the article transporter is pushed toward the vibratory head by a wedge action exerted by the wedge inclined surfaces along with the movement of the movable coupling member.

2. The article transport feeder according to claim 1, wherein
the elastically deformable spindle of the movable coupling member and the operation lever of the fastening unit are coupled to each other with a fastening rod.

3. The article transport feeder according to claim 2, further comprising a coupling member and a bush, wherein
the coupling member is externally mounted to an intermediate portion of the elastically deformable spindle of the movable coupling member, and
the bush is fitted to a portion of the movable coupling member at which the elastically deformable spindle is inserted through.

4. The article transport feeder according to claim 3, wherein
the operation lever is provided with a spindle, and
the fastening rod is threadedly connected to the coupling member externally fitted to the intermediate portion of the spindle and the spindle of the operation lever in a reverse threaded relationship.

5. A combination scale, comprising:
a dispersion feeder;
a plurality of linear feeders radially disposed around the dispersion feeder; and
a plurality of feeding feeders disposed correspondingly to the linear feeders,
the linear feeders each being the article transport feeder according to claim 1, the article transport feeders each comprising a trough, each of the troughs serving as the article transporter removably attachable to the vibratory head of the vibration mechanism.

* * * * *